Feb. 24, 1953     H. R. HOWELL     2,629,170
MOTION CHECK FOR CUTTING SHEARS
Filed April 5, 1950     3 Sheets-Sheet 1
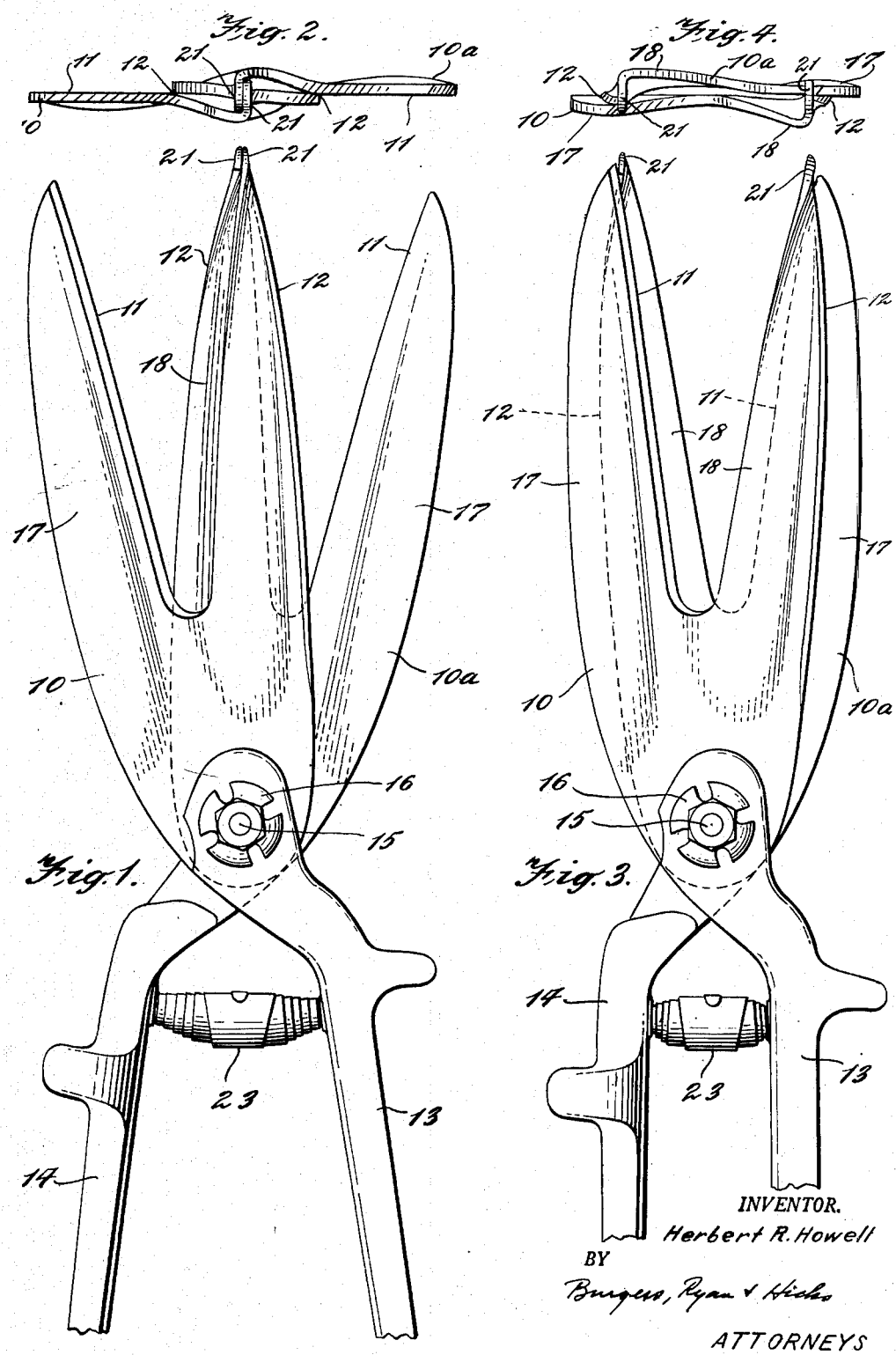
INVENTOR.
Herbert R. Howell
BY
Burgess, Ryan & Hicks
ATTORNEYS

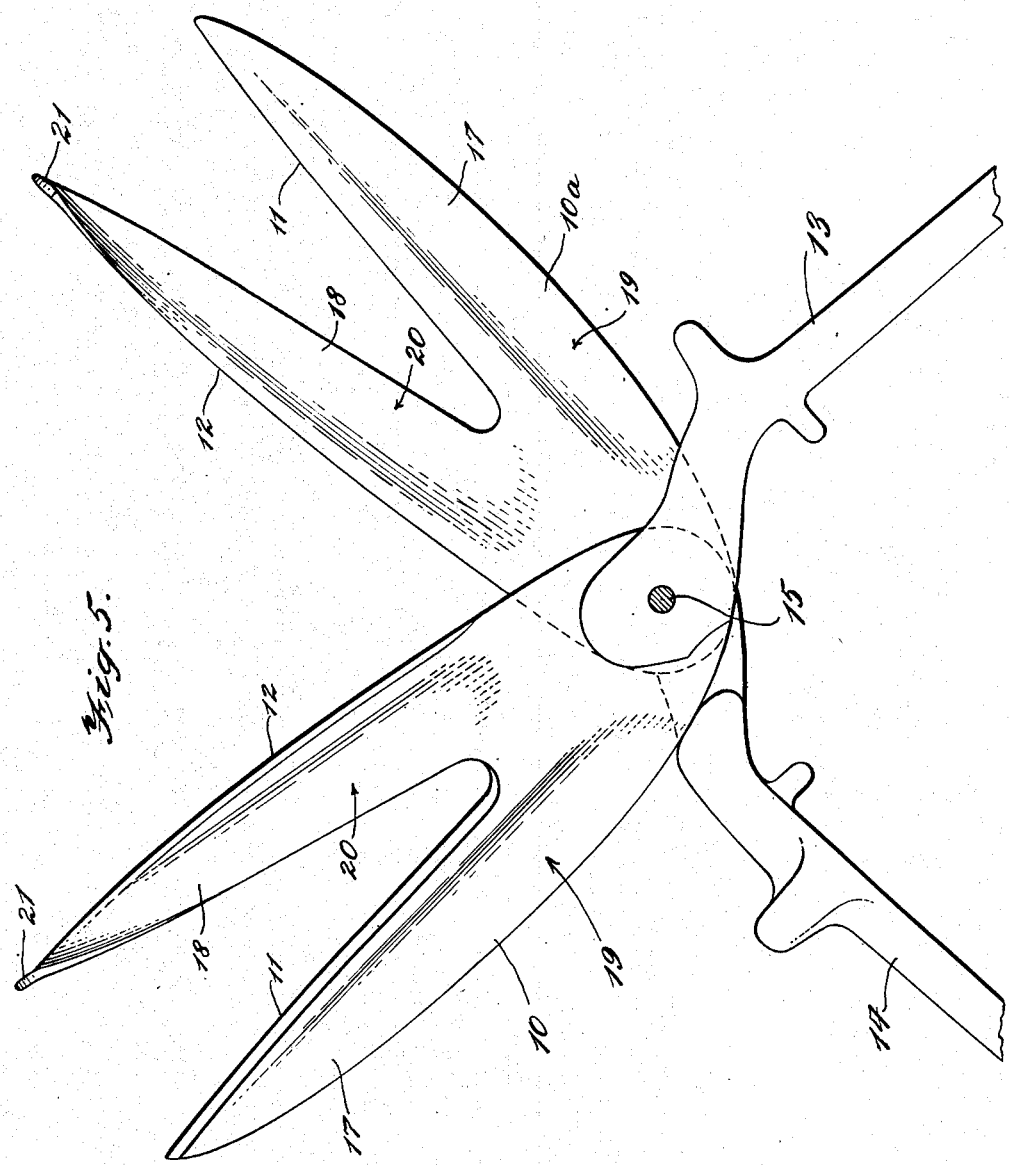

Feb. 24, 1953 H. R. HOWELL 2,629,170
MOTION CHECK FOR CUTTING SHEARS
Filed April 5, 1950 3 Sheets-Sheet 3
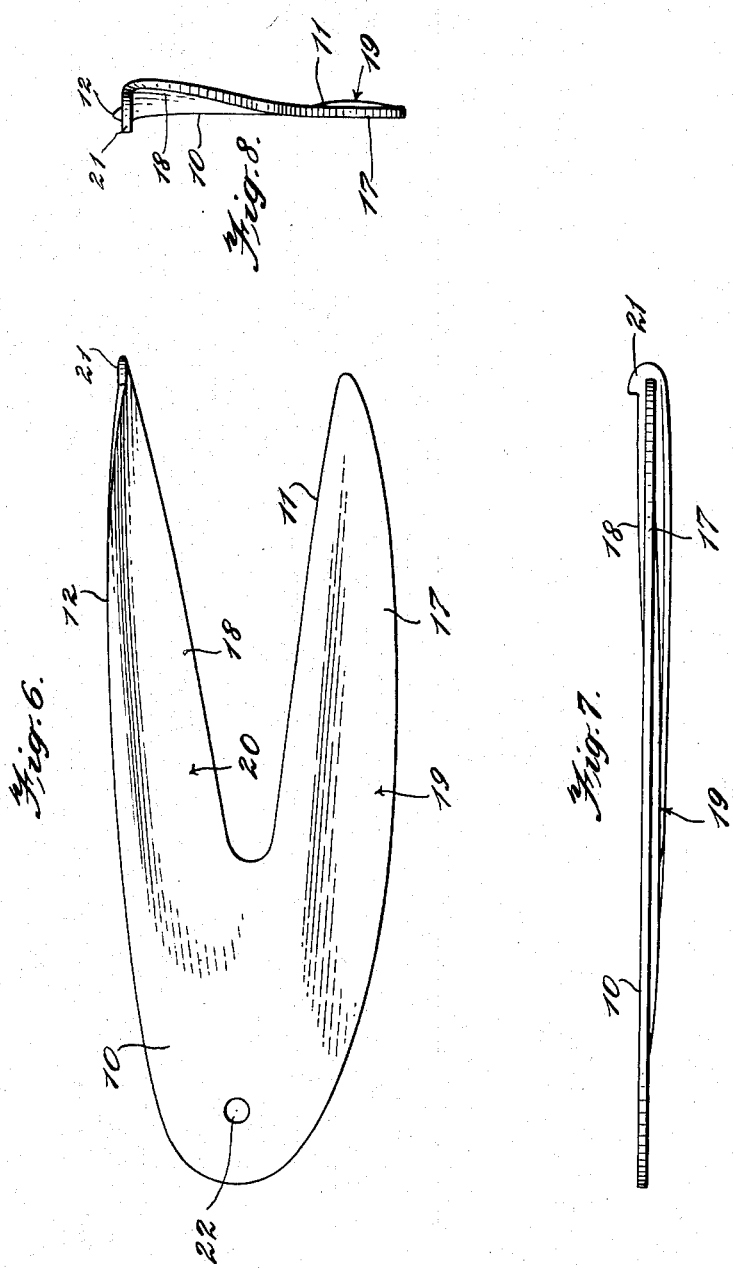
INVENTOR.
Herbert R. Howell
BY
ATTORNEYS Patented Feb. 24, 1953

2,629,170

UNITED STATES PATENT OFFICE 2,629,170

MOTION CHECK FOR CUTTING SHEARS

Herbert R. Howell, Summit, N. J.

Application April 5, 1950, Serial No. 154,137

11 Claims. (Cl. 30—213)

The present invention relates to improvements in cutting shears of the multiple-blade type and relates more particularly to a motion check for such shears.

An object of the present invention is to provide a motion check for a multiple-blade, cutting shear that permits a full opening and closing movement of the blades without adjustment and upon assembly of the blades. In accordance with the present invention, the motion check is located at a position on the blades where slight variations do not materially affect the opening of the blades and consequently, the desired opening of the blades is insured. A further object of the invention is to provide a motion check that will permit the opposed cutting blades of the shear to be readily separated for cleaning and sharpening.

Still another object of the invention is to provide a multiple-blade, cutting shear in which the cutting members are identical, thus saving the expense in tooling and in the handling of the cutting members in manufacture. Other objects and advantages of the invention will be apparent and best understood from the following description and the accompanying drawings in which:

Figs. 1 and 2 are plan and end views, respectively, of a cutting shear embodying the invention with the blades in open position;

Figs. 3 and 4 are plan and end views, respectively, of the cutting shear shown in Figs. 1 and 2, but with the blades in closed position;

Fig. 5 is a plan view of the cutting shear shown in Fig. 1 with the blades separated; and Figs. 6, 7, and 8 are a plan view from the rear, an end view, and a side view, respectively, of a blade for the cutting shear shown in Fig. 1.

Referring to the drawings in detail, there is a cutting shear which has a pair of cutting members 10 and 10a each of which has two spaced blade portions 17 and 18 with cuttings edges 11 and 12, respectively, extending along the sides thereof. Handles 13 and 14 are secured to the cutting members 10 and 10a, respectively, at the lower ends thereof. The respective cutting members and handles are pivoted in crossed relation to each other on a bolt 15 intermediate their ends. The blades 18 of the respective cutting members are centrally located and extend across each other so that the respective cutting edges 11 thereon move across the cutting edge 12 on the spaced blade 17 of the opposing cutting member upon pivotal movement of the cutting members with respect to each other. A resilient spring washer 16 at the bolt 15 holds the blades in cutting engagement with each other. Thus, when the handles 13 and 14 are moved toward each other, the cutting edge 11 on one of the blades moves across the cutting edge 12 on the opposing blade in the cutting movement of the shear.

The blades illustrated are shaped to be self-sharpening and self-adjusting, and in these respects, the construction and operation of the shear is, in general, similar to the multiple-edge, cutting shear described and claimed in my Patent No. 2,566,492, issued September 4, 1951, entitled Cutting Shears, to which reference may be made for a detailed explanation of such features of the construction and operation of such a shear.

For convenience of assembly and economy of manufacture, the cutting members 10 and 10a are identical, and hence, the construction of only one member need be described in detail here. As shown in Figs. 6, 7, and 8, the cutting member 10 may be stamped from a strip of spring steel and the two spaced blades 17 and 18 taper to points or tips at their ends with the cutting edges 11 and 12 extending along one side of the respective blades. In order to reduce the weight of the shear and to give the blades sufficient rigidity, the cutting member may be domed as indicated at 19 and 20.

A motion check or stop 21 is located at the tip of the blade 18 on which the cutting edge 12 is formed. The motion check 21 may be formed by bending the tip of the prong 18 at an acute angle to plane of the blade or, if desired, by securing a separate piece to the blade 18 at the tip thereof. A hole 22 is also provided at the base of the cutting member to receive the bolt 15.

After the cutting member has been suitably shaped and formed, it may be suitably heat treated to harden and temper the blades. By making the cutting members identical, any warping that may occur in the hardening process will be equalized when the two members are assembled and will avoid practically all necessity for blade setting in assembly. Also, since the motion check 21 and the bolt hole 22 are part of the member, there will be positive and accurate adjustment of the motion checks immediately upon assembly. It will be understood that, if desired, the motion check 21 may be formed only on the blade 18 of one of the cutting members. In this event, the cutting members will be identical except for this feature.

As shown best in Fig. 1, when the cutting members are assembled and the blades are in cutting relation to each other, the rear edges of the centrally disposed blades 18 overlap until the stop 21 on one of the blades strikes the stop 21 on the opposing blade. When the blades 18 are in this position; i. e., with the motion checks or stops 21 thereon in engagement, the blades of the shear are in their fully open position. As shown best in Fig. 2, the rear surfaces of the motion checks 21 are flat and mate with each other. Thus, when the cutting members are in cutting relation to each other, at which position they are normally held by a spring 23 acting to force the handles apart, the flat rear surfaces of the motion stops 21 are in engagement and prevent the blades from opening further.

By placing the motion checks 21 at the tip ends of the blades 18, a full opening of the blades and thus, a full cutting stroke is insured because the distance of the checks 21 from the pivot point at the bolt 15 is such that the adjustment of the motion checks 21 is not at all critical, and slight variations do not materially affect the opening movement of the blades. When a motion check or motion stop is located adjacent the pivot point in the usual manner, its adjustment to obtain a full opening of the blades becomes critical because small differences in the position of such stops have a greatly increased effect on the position of the blades. The present invention also avoids any difficulties that may develop when the bolt wears or looseness develops at the pivot point of the blades.

The motion checks 21 are also positioned to engage with the tip end of the blade 17 of the opposing blade when the blades are closed and they, thus, accurately limit the cutting movement of the blades. This arrangement of the stops permits a full cutting stroke to be obtained with the minimum movement of the handles. It is appreciated that stops have been used at the tips of the blades of cutters or scissors of the customary type having two opposed cutting edges. In such an arrangement, the stops limit the closing movement of the blades, but they do not limit the opening movement of the blades and of course, such stops do not concern the separation of the blades.

Due to their over-all length, the blades are more or less flexible inherently, but in any event, the cutting members may be made flexible or may be resiliently held in cutting engagement by the flexible washer 16 so that when the blades are in open position, the tips of the blades 18 may be flexed or moved laterally in opposite directions with respect to each other so as to permit the motion check 21 on one blade to pass over the motion check 21 on the opposing blade. When this is done, cutting members may be swung apart so that both of the blades on each cutting member may be completely separated from the other cutting member (as shown in Fig. 5) and may be thoroughly cleaned or sharpened. Such a separation of the blades is not possible where a fixed motion stop engages with one or both of the blades at the pivot point thereof.

It will be understood that various modifications and changes may be made in the embodiment of the invention illustrated and described herein without departing from the scope of the invention as defined by the claims as appended hereto.

I claim:

1. In a cutting shear, the combination of a pair of cutting members each having a plurality of spaced blades, each of said blades having a cutting edge along one side thereof, said members being pivotally secured together in opposed cutting relation to each other with the cutting edges on the blades of one member being movable across cutting edges on the blades of the opposing cutting member upon pivotal movement of the cutting members relative to each other and a motion check carried at the outer end of one of the blades on one of the cutting members, said motion check extending from the surface of said first-mentioned blade between a pair of the spaced blades on the opposing member and engaging with the rear edge of one of said pair of blades when the blades of the cutting members are in open position.

2. In a cutting shear, the combination as defined in claim 1 wherein the blades of the opposing cutting members are resiliently movable in a lateral direction away from each other a distance sufficient to disengage the motion check from the rear edge of the blade on the opposing cutting member.

3. In a cutting shear, the combination comprising a pair of cutting members, each of said members having a plurality of spaced blades, each of said blades having a cutting edge along one side thereof, said members being pivotally secured together in opposed cutting relation to each other with the cutting edges on the blades of one member being movable across the cutting edges of the opposing blade of the other member upon pivotal movement of the cutting members relative to each other and a projection carried at the outer end of one of the blades of one of the cutting members, said projection extending between a pair of the blades on the opposing member and engaging with the rear edge of one of said pair of blades upon pivotal movement of the cutting members in one direction and with the cutting edge of the other of said pair of blades upon pivotal movement of cutting members in the opposite direction.

4. In a cutting shear, the combination as defined in claim 3 wherein the blades of the opposing cutting members are resiliently movable in a lateral direction with respect to each other, said movement permitting a lateral separation of the blades of the cutting members sufficient to disengage said projection from engagement with the blades of the opposing member.

5. In a cutting shear of the type wherein a pair of cutting members each having a pair of spaced blades with cutting edges extending along one side of each of the blades are pivotally secured in opposed cutting relation to each other with one blade of each of the cutting members being centrally disposed and crossing the centrally disposed blade of the opposing cutting member and the cutting edges on said centrally disposed blades are movable across the cutting edge of a second blade on the opposing cutting members upon pivotal movement of the cutting members relative to each other, the improvement which includes a motion check carried at the tip end of at least one of the centrally disposed blades of the opposed cutting members, said motion check projecting between the pair of spaced blades on the other of said members and engaging with the rear edge of the centrally disposed blade of the opposing cutting member at the open position of the blades and engaging with the cutting edge of the second blade on the opposing cutting member at the closed position of the blades.

6. In a cutting shear the improvement, as defined in claim 5 wherein the motion check is resiliently held in position for engagement with the blade of the opposing cutting member and is movable laterally out of said blade engaging position.

7. In a cutting shear of the type wherein a pair of cutting members each having a pair of spaced blades with cutting edges extending along one side of each of the blades are pivotally secured in opposed cutting relation to each other with one blade of each of the members being centrally disposed and crossing the centrally disposed blade of the opposing cutting member and the cutting edges on said centrally disposed blades are movable across a cutting edge of a second blade on the opposing cutting member upon pivotal movement of the cutting members relative to each other, the improvement which includes a pair of identical cutting members, a motion check carried at the tip end of the centrally disposed blade of each of said members, said motion checks extending at acute angles to the planes of their respective blades and engaging with the rear surfaces of the motion check on the blade of the opposing cutting member at the open position of the blades.

8. In a cutting shear, the improvement as defined in claim 7 wherein said centrally disposed blades are flexibly movable away from each other a distance sufficient for the motion checks on the respective blades thereof to clear each other and permit the blades of the cutting members to be swung apart upon continued movement thereof.

9. In a multi-bladed cutting shear of the self-sharpening, self-aligning type, the combination comprising a pair of cutting members, each of said members having a plurality of cutting blades thereon with cutting edges extending along one side thereof, said members being pivotally secured together with the cutting edges of the blades on one member thereon in opposed cutting relation to the cutting edges of the blades on the other member, a projection carried at the outer end of one of the blades of one of the members and extending between a pair of the blades of the opposing member and said projection engaging with the cutting edge of one of said pair of blades upon pivotal movement of the cutting members in one direction and with the rear edge of the other of said pair of blades upon pivotal movement of the cutting members in the opposite direction, operating members extending from each of the cutting members for pivotally moving said cutting members relative to each other and a spring acting on said cutting members, said spring normally holding the cutting members in a position where the blades thereof are open and the projection on the blade of one member engages with the rear edge of one of the blades of the other member.

10. In a multi-bladed cutting shear, the combination as defined in claim 9 wherein the cutting members are identical and one of the blades on each of said cutting members has a projection thereon and opposing surfaces on said projections are held in engagement by the spring when the blades are open.

11. In a multi-bladed cutting shear, the combination as defined in claim 9 which includes resilient means holding the cutting members into opposing cutting relation to each other, said means permitting the blades to be moved apart laterally a distance sufficient to move said projection out of engagement with the blades on the opposing member.

HERBERT R. HOWELL.

REFERENCES CITED

The following references are of record in the file of this patent:

UNITED STATES PATENTS

| Number | Name | Date |
|---|---|---|
| 136,209 | Borden | Feb. 25, 1873 |
| 868,706 | Schepman | Oct. 22, 1907 |
| 2,241,719 | Hardin | May 13, 1941 |

FOREIGN PATENTS

| Number | Country | Date |
|---|---|---|
| 199,932 | Great Britain | July 5, 1923 |